(12) United States Patent  (10) Patent No.: US 9,019,875 B2
Yu et al.  (45) Date of Patent: Apr. 28, 2015

(54) SYSTEM, TERMINAL AND METHOD FOR TRANSMITTING 1X MESSAGES

(75) Inventors: Yuanfang Yu, Shenzhen (CN); Xiaowu Zhao, Shenzhen (CN); Ting Lu, Shenzhen (CN); Yonggang Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 169 days.

(21) Appl. No.: 13/701,069

(22) PCT Filed: Apr. 22, 2011

(86) PCT No.: PCT/CN2011/073201
§ 371 (c)(1),
(2), (4) Date: Nov. 30, 2012

(87) PCT Pub. No.: WO2011/150725
PCT Pub. Date: Dec. 8, 2011

(65) Prior Publication Data
US 2013/0070684 A1    Mar. 21, 2013

(30) Foreign Application Priority Data
Jun. 4, 2010  (CN) .......................... 2010 1 0194456

(51) Int. Cl.
*H04W 4/00*   (2009.01)
*H04L 12/58*  (2006.01)
*H04W 68/00*  (2009.01)

(52) U.S. Cl.
CPC .............. *H04L 51/38* (2013.01); *H04W 68/00* (2013.01); *H04L 12/58* (2013.01); *H04L 12/587* (2013.01); *H04L 12/5895* (2013.01)

(58) Field of Classification Search
CPC ..... H04W 88/06; H04W 68/12; H04W 36/14; H04W 68/00; H04W 36/0022
See application file for complete search history.

(56) References Cited

U.S. PATENT DOCUMENTS

| 8,009,691 B2 | 8/2011 | Liu |
| 8,139,522 B2* | 3/2012 | Long et al. ................... 370/328 |
| 8,432,901 B2* | 4/2013 | Wang et al. ................... 370/352 |

(Continued)

FOREIGN PATENT DOCUMENTS

| CN | 1849001 A | 10/2006 |
| CN | 1937830 A | 3/2007 |

(Continued)

OTHER PUBLICATIONS

International Search Report (in Chinese with English translation) for PCT/CN2011/073201, mailed Jul. 28, 2011; ISA/CN.

(Continued)

*Primary Examiner* — Fan Ng
(74) *Attorney, Agent, or Firm* — Harness, Dickey & Pierce, PLC

(57) ABSTRACT

The disclosure provides a system, end and method for transmitting 1x messages. The method comprises: when a sending terminal needs to send a plurality of 1x messages to a receiving terminal through a non-1x network, carrying the plurality of 1x messages in one message. With the technical solution of the disclosure, the problem that it is unable to ensure that a plurality of 1x Layer3 messages is transmitted synchronously under the related inter-working situation and the problem of the processing time sequence of messages are solved.

15 Claims, 3 Drawing Sheets

(56) References Cited

U.S. PATENT DOCUMENTS

| | | | |
|---|---|---|---|
| 8,503,430 B2* | 8/2013 | Shahidi et al. | 370/352 |
| 2004/0037222 A1* | 2/2004 | Kim et al. | 370/229 |
| 2008/0014968 A1* | 1/2008 | Yoon | 455/456.5 |
| 2008/0117859 A1* | 5/2008 | Shahidi et al. | 370/328 |
| 2009/0022108 A1 | 1/2009 | Liu | |
| 2010/0284333 A1* | 11/2010 | Shirota et al. | 370/328 |
| 2010/0290437 A1* | 11/2010 | Wang et al. | 370/335 |

FOREIGN PATENT DOCUMENTS

| | | |
|---|---|---|
| CN | 1941996 A | 4/2007 |
| CN | 101141791 A | 3/2008 |
| CN | 101640934 | 2/2010 |
| JP | 2009517894 A | 4/2009 |

OTHER PUBLICATIONS

EP Search Report for corresponding EP application dated Jan. 10, 2014.

"3rd Generation Partnership Project; 1-15, Technical Specification Group Services and System Aspects; Circuit Switched (CS) A fallback in Evolved Packet System (EPS); Stage 2 (Release 9)", 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V9.3.0, Mar. 26, 2010, pp. 1-66, XP050402081, [retrieved on Mar. 26, 2010].

* cited by examiner

SYSTEM, TERMINAL AND METHOD FOR TRANSMITTING 1X MESSAGES

CROSS REFERENCE TO RELATED APPLICATIONS

This application is a 371 U.S. National Stage of International Application No. PCT/CN2011/073201, filed Apr. 22, 2011, and claims priority to Chinese patent application No. 201010194456.8, filed Jun. 4, 2010, the disclosures of which are herein incorporated by reference in their entirety.

FIELD OF THE INVENTION

The disclosure relates to the field of communication, and in particular to a system, terminal and method for transmitting 1x messages.

BACKGROUND OF THE INVENTION

With the evolution from the Code-Division Multiplex Access (CDMA) network to the Long Term Evolution (LTE) network, gradually services will be borne by the LTE network. At the initial stage of LTE network establishment, the main purpose is to cover hot spot areas and provide high-speed non-real-time data services. Voice Over Internet Protocol (VoIP) is not deployed. Voice services were still borne by 1x Circuit Service (CS). Therefore, the inter-working between the CDMA20001 1x and the LTE mainly lies in the support of 1x Circuit Service Fall Back (1xCSFB). FIG. 1 shows network architecture of 1xCSFB according to the relative art. As shown in FIG. 1, one of logic functions of the Inter-working Solution (IWS) is to serve as a CDMA 1x message translation. That is, information or message of 1x network air interface sent by a terminal through an LTE network air interface has to be sent to the IWS first and then forwarded by the IWS to a 1x core network switch. Similarly, if information or message from the switch of the 1x network needs to pass through the LTE network air interface to be sent to the terminal, then the information or message has to be sent to the IWS first and then forwarded by the IWS to the LTE network. The logic functions of the IWS may be realized in a 1x Base Station Controller (1x BSC), may be realized in a Mobile Switching Center (MSC), may be realized in a Mobility Management Entity (MME) in the LTE network, and also may be independent network entities. In order to standardize processing at the terminal side and the network side, CDMA Standards define a general circuit service notification application (GCSNA) protocol to support inter-working among the CDMA2000 1x, the LTE and other radio access technologies. The GCSNA protocol defines formats of 1x messages which can be carried in a General Circuit Service Notification Application 1x Circuit Service (GCSNA1xCircuitService) message. According to regulations of the protocol, it is only allowed to carry one 1x Layer3 message in the GCSNA1xCircuitService message. In this way, processing in some situation will be failed. For example, in order to synchronously send a plurality of 1x Layer3 messages and guarantee the time sequence of processing the messages, under the related mechanism it needs a plurality of GCSNA1xCircuitService messages to respectively carry one 1x Layer3 message. Due to the complexity (such as message loss retransmission and packet cache) of the air interface transmission mechanism, it is unable to guarantee the synchronous sending and receiving of messages, thereby causing the failed inter-working processing between the CDMA2000 1x and other radio access technologies including the LTE.

SUMMARY OF THE INVENTION

The disclosure provides a system, terminal and method for transmitting 1x messages, to solve the technical problem in the related art that it is unable to send a plurality of 1x Layer3 messages synchronously.

According to one aspect of the disclosure, a method for transmitting 1x messages is provided, comprising: carrying a plurality of 1x messages in one message, when a sending terminal needs to send the plurality of 1x messages to a receiving terminal through a non-1x network.

After receiving the message containing a plurality of 1x messages, the receiving terminal processes the plurality of 1x messages according to a sequence of the messages.

The carried plurality of 1x messages are encapsulated in different data units respectively.

The sending terminal is an Inter-working Solution (IWS); after receiving a paging request message or a feature notification message which is sent from a mobile switching center and carries a caller number, the IWS encapsulates the caller number in the feature notification message of a 1x air interface, and encapsulates a general paging message and the feature notification message of the 1x air interface in one message, and sends to the receiving terminal; and the receiving terminal is a terminal which is located in a non-1x network and supports 1x and other radio access technologies.

The terminal receives the message containing the feature notification message and the general paging message, and extracts the feature notification message first; and further processes the general paging message if a user chooses to accept the call, and does not process the general paging message if the user chooses to refuse the call.

The sending terminal is an IWS; and the receiving terminal is a terminal which is located in a non-1x network and supports 1x and other radio access technologies; and during paging processing and resource allocation process under a situation of inter-working among the IWS, the terminal and a 1x network, after completing the resource allocation, the IWS encapsulates a constructed resource assignment message of a 1x air interface and an incoming call notification message of the 1x air interface in one message and then sends to the terminal.

The terminal receives the message containing the resource assignment message of the 1x air interface and the incoming call notification message of the 1x air interface, processes the resource assignment message first, and then processes the incoming call notification message; and the resource assignment message of the 1x air interface is an extended channel assignment message and/or a universal handoff direction message.

The sending terminal is an IWS; and the receiving terminal is a terminal which is located in a non-1x network and supports 1x and other radio access technologies; during the call processing and resource allocation process under a situation of inter-working among the IWS, the terminal and a 1x network, after completing the resource allocation, the IWS encapsulates a plurality of constructed resource assignment messages of a 1x air interface in one message and then sends to the receiving terminal; and the plurality of resource assignment messages of the 1x air interface contain an extended channel assignment message and a universal handoff direction message.

After receiving the message containing the extended channel assignment message and the universal handoff direction message, the terminal processes the extended channel assignment message first, and then processes the universal handoff direction message.

The message carrying the plurality of 1x messages is a General Circuit Service Notification Application 1x Circuit Service (GCSNA1xCircuitService) message.

The data unit in which the 1x messages are encapsulated is a 1x Layer3 data unit or a 1x Layer2 data unit.

The sending terminal is a terminal which is located in a non-1x network and supports 1x and other radio access technologies; and the receiving terminal is an IWS.

The message carrying the plurality of 1x messages is a message defined by a protocol supporting inter-working between CDMA2000 1x RTT and other radio access technologies.

According to another aspect of the disclosure, a system for transmitting 1x messages is further provided, comprising a sending terminal and a receiving terminal, wherein the sending terminal is configured to, when the sending terminal needs to send a plurality of 1x messages to a receiving terminal through a non-1x network, carry the plurality of 1x messages in one message.

The receiving terminal is configured to, after receiving the message containing the plurality of 1x messages, process the plurality of 1x messages according to a sequence of the messages.

The sending terminal encapsulates the sent plurality of 1x messages in different data units respectively.

The sending terminal is an Inter-working Solution (IWS); after receiving a paging request message or a feature notification message which is sent from a mobile switching center and carries a caller number, the IWS encapsulates the caller number in a feature notification message of a 1x air interface, encapsulates a general paging message and the feature notification message of the 1x air interface in one message, and then sends to the receiving terminal; and the receiving terminal is a terminal which is located in a non-1x network and supports 1x and other radio access technologies.

That the receiving terminal processes the plurality of 1x messages according to the sequence of the messages after receiving the message containing the plurality of 1x messages comprises: after receiving the message containing the feature notification message and the general paging message, the terminal extracting the feature notification message first; and further processing the general paging message if a user chooses to accept the call, and not processing the general paging message if the user chooses to refuse the call.

The sending terminal is an IWS; the receiving terminal is a terminal which is located in a non-1x network and supports 1x and other radio access technologies; and during paging processing and resource allocation process under a situation of inter-working among the IWS, the terminal and a 1x network, after completing the resource allocation, the IWS encapsulates a constructed resource assignment message of a 1x air interface and an incoming call notification message of the 1x air interface in one message, and then sends to the terminal.

That the receiving terminal processes the plurality of 1x messages according to the sequence of the messages after receiving the message containing the plurality of 1x messages comprises: after receiving the message containing the resource assignment message of the 1x air interface and the incoming call notification message of the 1x air interface, the terminal processing the resource assignment message first, and then processing the incoming call notification message; and the resource assignment message of the 1x air interface is an extended channel assignment message and/or a universal handoff direction message.

The sending terminal is an IWS, the receiving terminal is a terminal which is located in a non-1x network and supports 1x and other radio access technologies; during call processing and resource allocation process under a situation of inter-working among the IWS, the terminal and a 1x network, after completing the resource allocation, the IWS encapsulates a plurality of constructed resource assignment messages of the 1x air interface in one message, and then sends to the terminal; and the plurality of resource assignment messages of the 1x air interface contain an extended channel assignment message and a universal handoff direction message.

That the receiving terminal processes the plurality of 1x messages according to the sequence of the messages after receiving the message containing the plurality of 1x messages comprises: after receiving the message containing a plurality of extended channel assignment messages and universal handoff direction messages, the terminal processing the extended channel assignment messages first, and then processing the universal handoff direction messages.

The message carrying the plurality of 1x messages is a General Circuit Service Notification Application 1x Circuit Service (GCSNA1xCircuitService) message.

The data unit in which the 1x messages are encapsulated is a 1x Layer3 data unit or a 1x Layer2 data unit.

The sending terminal carries the plurality of 1x messages in one message defined by a protocol supporting inter-working between CDMA2000 1x RTT and other radio access technologies.

According to still another aspect of the disclosure, a terminal for transmitting 1x messages is further provided, wherein the terminal is configured to, after receiving a message containing a plurality of 1x messages, process the plurality of 1x messages according to a sequence of the messages.

The terminal is a terminal which is located in a non-1x network and supports 1x and other radio access technologies; and after receiving a message containing a feature notification message and a general paging message, the terminal extracts the feature notification message first; and further processes the general paging message if a user chooses to accept the call, and does not process the general paging message if the user chooses to refuse the call.

The terminal is a terminal which is located in a non-1x network and supports 1x and other radio access technologies; after receiving a message containing a resource assignment message of a 1x air interface and an incoming call notification message of the 1x air interface, the terminal processes the resource assignment message first, and then processes the incoming call notification message; and the resource assignment message of the 1x air interface is an extended channel assignment message and/or a universal handoff direction message.

The terminal is a terminal which is located in a non-1x network and supports 1x and other radio access technologies; and after receiving the message containing the extended channel assignment message and the universal handoff direction message, the terminal processes the extended channel assignment message first, and then processes the universal handoff direction message.

In conclusion, the disclosure provides a system, a terminal and a method for transmitting 1x messages, to solve the problem that it is unable to ensure that a plurality of 1x Layer3 messages is transmitted synchronously under the related inter-working situation and the problem of the processing time sequence of messages.

DETAILED DESCRIPTION OF THE EMBODIMENTS

Figure 1:
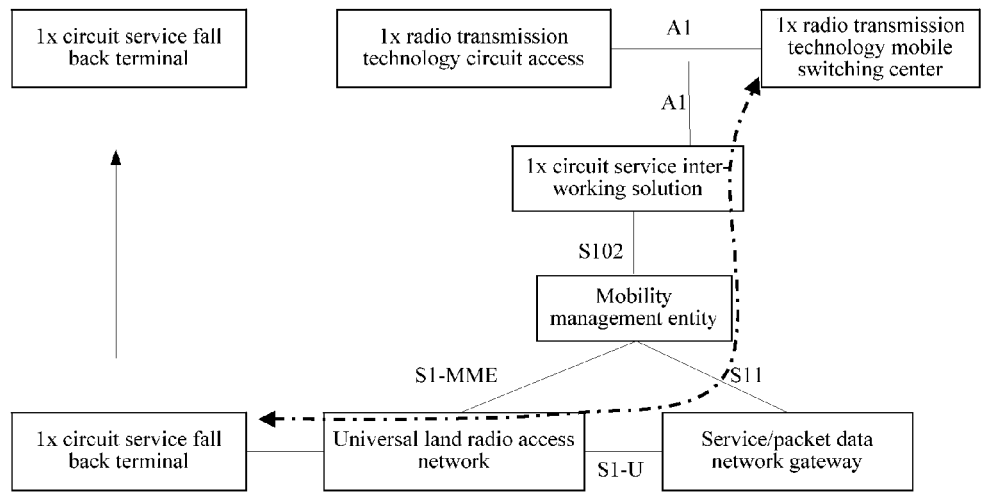
FIG. 1 shows a network architecture diagram of 1xCSFB according to the related art.

The embodiment provides a system for transmitting 1x messages, comprising a sending terminal and a receiving terminal. The sending terminal is configured to, when the sending terminal needs to send a plurality of 1x messages to the receiving terminal through a non-1x network, carry the plurality of 1x messages in one message. The receiving terminal is configured to, after receiving the message containing the plurality of 1x messages, process the plurality of 1x messages according to a sequence of the messages.

The sending terminal encapsulates the sent plurality of 1x messages in different data units respectively.

The sending terminal is an IWS, and the receiving terminal is a terminal which is located in a non-1x network and supports 1x and other radio access technologies. After receiving a paging request message or feature notification message which is sent from a mobile switching center and carries a caller number, the IWS encapsulates the caller number in the feature notification message of the 1x air interface, encapsulates the general paging message and the feature notification message of the 1x air interface in one message, and sends to the receiving terminal; and the step that the receiving terminal processes the plurality of 1x messages according to a sequence of the messages after receiving the message containing the plurality of 1x messages comprises: after receiving the message containing the feature notification message and the general paging message, the terminal extracting the feature notification message first, and further processing the general paging message if the user chooses to accept the call, and not processing the general paging message if the user chooses to refuse the call.

During the paging processing and resource allocation process under a situation of inter-working among the IWS, the terminal and a 1x network, after completing the resource allocation, the IWS encapsulates a constructed resource assignment message of the 1x air interface and an incoming call notification message of the 1x air interface in one message and then sends to the terminal. The step that the receiving terminal processes the plurality of 1x messages according to a sequence of the messages after receiving the message containing a plurality of 1x messages comprises: after receiving the message containing the resource assignment message of the 1x air interface and the incoming call notification message of the 1x air interface, the terminal processing the resource assignment message first, and then processing the incoming call notification message. The resource assignment message of the 1x air interface is an extended channel assignment message and/or a universal handoff direction message.

During the call (calling or being called) processing and resource allocation process under a situation of inter-working among the IWS, the terminal and a 1x network, after completing resource allocation, the IWS encapsulates a plurality of constructed resource assignment messages of the 1x air interface in one message and then sends to the terminal. The plurality of resource assignment messages of the 1x air interface contain an extended channel assignment message and a universal handoff direction message.

The step that the receiving terminal processes the plurality of 1x messages according to a sequence of the messages after receiving the message containing a plurality of 1x messages comprises: after receiving the message containing a plurality of extended channel assignment messages and universal handoff direction messages, the terminal processing the extended channel assignment messages first, and then processing the universal handoff direction messages.

The message carrying a plurality of 1x messages is a GCSNA1xCircuitService message.

The data unit in which 1x messages are encapsulated is a 1x Layer3 data unit or a 1x Layer2 data unit.

The sending terminal carries the plurality of 1x messages in a message defined by a protocol supporting inter-working between CDMA2000 1x RTT and other radio access technologies.

The embodiment provides a terminal for transmitting 1x messages, which is configured to process the plurality of 1x messages according to a sequence of the messages after receiving the message containing the plurality of 1x messages.

The terminal is a terminal which is located in a non-1x network and supports 1x and other radio access technologies. After receiving the message containing the feature notification message and the general paging message, the terminal extracts the feature notification message first, and further processes the general paging message if the user chooses to accept the call, and does not process the general paging message if the user chooses to refuse the call.

After receiving the message containing the resource assignment message of the 1x air interface and the incoming call notification message of the 1x air interface, the terminal processes the resource assignment message first, and then processes the incoming call notification message. The resource assignment message of the 1x air interface is an extended channel assignment message and/or a universal handoff direction message.

After receiving the message containing the extended channel assignment message and the universal handoff direction message, the terminal processes the extended channel assignment message first, and then processes the universal handoff direction message.

The embodiment provides a method for transmitting 1x messages, comprising: when a sending terminal needs to send a plurality of 1x messages to a receiving terminal through a non-1x network, the plurality of 1x messages being carried in one message, and the receiving terminal processing the received plurality of 1x messages according to a sequence of the messages after receiving the message containing the plurality of 1x messages.

The message carrying the plurality of 1x messages is a message defined by a protocol supporting inter-working between CDMA2000 1 x Radio Transmission Technology (RTT) and other radio access technologies.

The disclosure will be described in detail hereinafter, taking the example of calling a multi-mode (including dual-mode) terminal which is located in a non-1x network and supports 1x and other radio access technologies. In this case the sending terminal is an IWS, and the receiving terminal is a multi-mode (including dual-mode) terminal which is located in a non-1x network and supports 1x and other radio access technologies.

Embodiment 1

Figure 2:
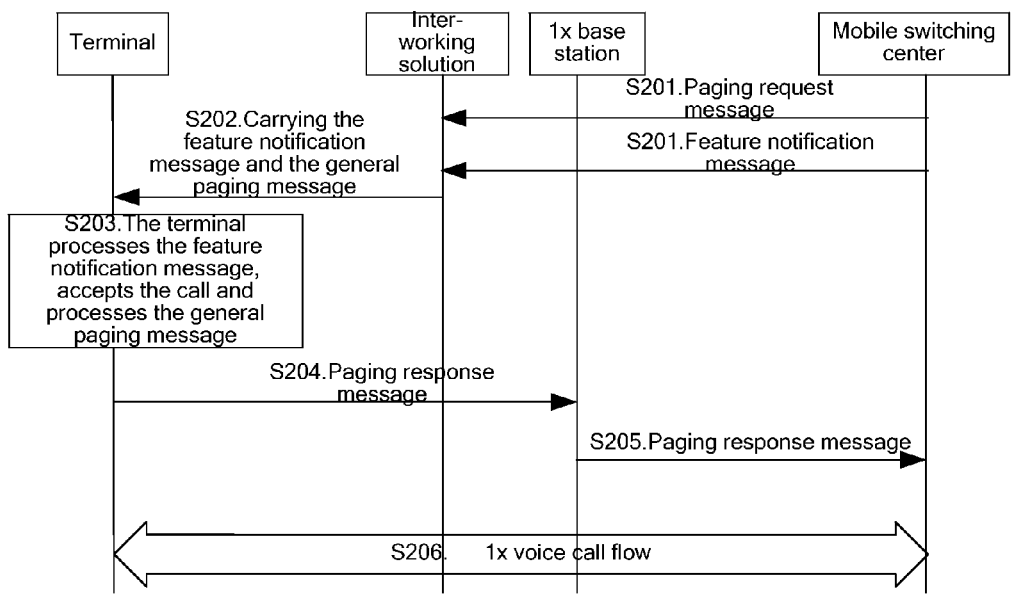
FIG. 2 shows a processing flowchart of accepting a call according to embodiment 1 of the disclosure.

As shown in FIG. 2, the processing flow of accepting a call according to the embodiment comprises the following steps.

Step S201: The MSC receives a request for calling a terminal in the service area of the MSC and the terminal is currently attached to a non-1x network (for example, the terminal may be in the LTE network). The MSC sends a paging request message to the IWS and carries the caller number in the paging request message. If the MSC sends out the paging request message without carrying the caller number therein, it needs to send a feature notification message to the IWS and carries the caller number in the feature notification message.

Step S202: After receiving the paging request message or feature notification message which carries the caller number, the IWS encapsulates the caller number in the feature notification message of the 1x air interface, encapsulates the general paging message and the feature notification message of the 1x air interface in one message, and sends to the terminal. The message carrying the general paging message and the feature notification message of the 1x air interface may be a GCSNA1xCircuitService message.

The general paging message and the feature notification message of the 1x air interface, carried in the GCSNA1xCircuitService message, are respectively encapsulated in different data units. The data unit in which 1x messages are encapsulated may be the 1x Layer3 data unit or the 1x Layer2 data unit.

Step S203: The terminal receives the GCSNA1xCircuitService message containing the feature notification message and the general paging message. The terminal determines that it supports the two messages and the two messages are the feature notification message and the general paging message respectively. Then, the terminal extracts the feature notification message first and displays it to the user. The user chooses to accept the call, and then the terminal processes the general paging message.

Step S204: The terminal turns to the 1x network and sends a paging response message to a 1x base station through the 1x network.

Step S205: The base station constructs a paging response message to the MSC.

Step S206: The terminal, the base station and the MSC continue the 1x voice call flow.

Embodiment 2

Figure 3:
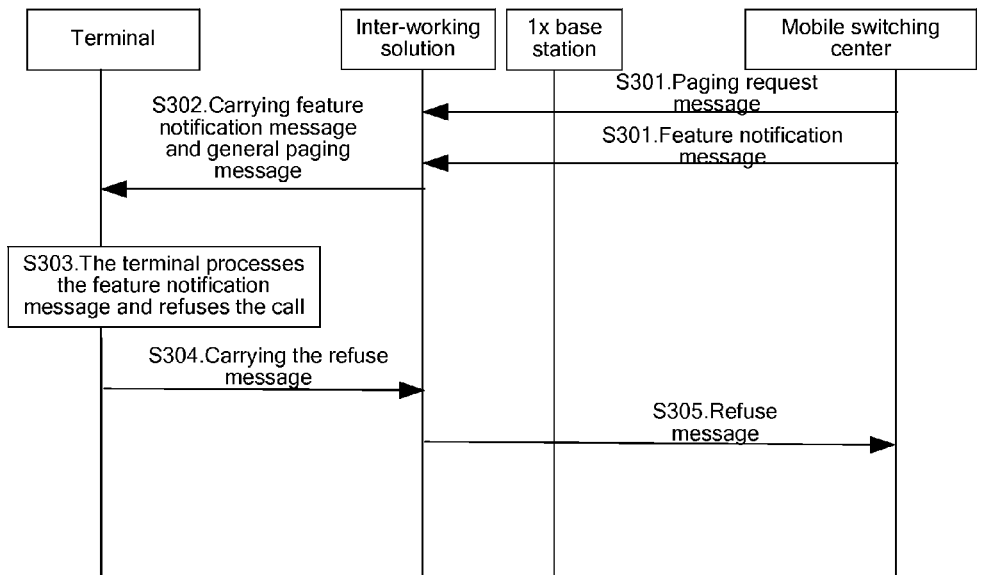
FIG. 3 shows the processing flowchart of refusing a call according to embodiment 2 of the disclosure.

As shown in FIG. 3, the processing flow of refusing a call according to the embodiment comprises the following steps.

Step S301: The MSC receives a request for calling a terminal in the service area of the MSC and the terminal is currently attached to a non-1x network (for example, the terminal may be in the LTE network). The MSC sends a paging request message to the IWS and carries the caller number in the paging request message; and if the MSC sends out the paging request message without carrying the caller number therein, it needs to send a feature notification message to the IWS and carries the caller number in the feature notification message.

Step S302: After receiving the paging request message or feature notification message which carries the caller number, the IWS encapsulates the caller number in the feature notification message of the 1x air interface, encapsulates the general paging message and the feature notification message of the 1x air interface in one message, and sends to the terminal; and the message carrying the general paging message and the feature notification message of the 1x air interface may be a GCSNA1xCircuitService message.

The general paging message and the feature notification message of the 1x air interface, carried in the GCSNA1xCircuitService message, are respectively encapsulated in different data units. The data unit in which 1x messages are encapsulated may be the 1x Layer3 data unit or the 1x Layer2 data unit.

Step S303: The terminal receives the GCSNA1xCircuitService message containing the feature notification message and the general paging message. The terminal determines that it supports the two messages and the two messages are the feature notification message and the general paging message respectively. Then, the terminal extracts the feature notification message first and displays it to the user. The user chooses to refuse the call, and then the terminal does not process the general paging message.

Step S304: The terminal encapsulates the release order message in the GCSNA1xCircuitService message and sends to the IWS.

Step S305: The IWS constructs a refuse message to the MSC.

In other application situation, the sending terminal may be a terminal which is located in a non-1x network and supports 1x and other radio access technologies, and the receiving terminal may be an IWS. That is, the terminal carries a plurality of 1x messages in the GCSNA1xCircuitService message sent to the IWS.

Embodiment 3

Figure 4:
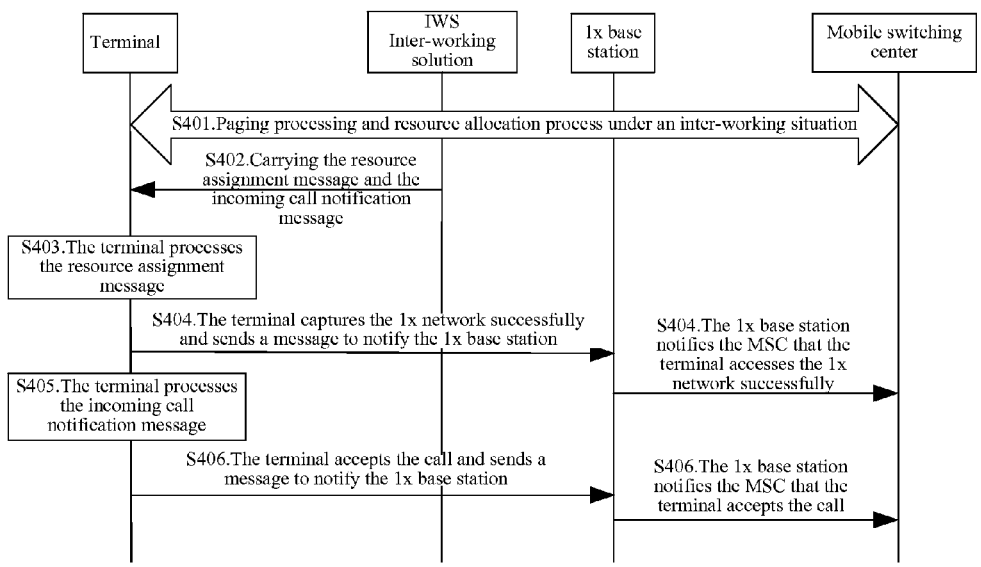
FIG. 4 shows the processing flowchart of accepting a call according to embodiment 3 of the disclosure.

As shown in FIG. 4, another processing flow of accepting a call according to the embodiment comprises the following steps.

Step S401: The paging processing and resource distribution process under the situation of inter-working among the terminal, the IWS and the 1x network, comprising paging and transferring of a paging response message through tunnels provided by other radio access technologies, subsequent establishment and resource distribution process triggered by the paging response, etc.

Step S402: After completing the resource distribution, the IWS constructs a resource assignment message of the 1x air interface and an incoming call notification message of the 1x air interface, encapsulates the two 1x messages in one message and sends to the terminal; and the message carrying the resource assignment message and the incoming call notification message of the 1x air interface may be a GCSNA1xCircuitService message.

The resource assignment message of the 1x air interface and the incoming call notification message, carried in the GCSNA1xCircuitService message, are respectively encapsulated in different data units. The data unit in which 1x messages are encapsulated may be the 1x Layer3 data unit or the 1x Layer2 data unit.

Step S403: The terminal receives the GCSNA1xCircuitService message containing the resource assignment message and the incoming call notification message, determines that it supports the two messages and the two messages are the resource assignment message and the incoming call notification message respectively. Then, the terminal first extracts the resource assignment message to a 1x protocol stack for processing.

Step S404: The terminal successfully captures the 1x network and sends a message to notify the 1x network, wherein the step that the terminal sends a message to notify the 1x network means that the terminal sends a message to notify the 1x base station that the terminal accesses successfully, and then the 1x base station notifies the MSC that the terminal accesses successfully.

Step S405: After successfully capturing the 1x network, the terminal extracts the incoming call notification message for processing.

Step S406: According to the incoming call notification message, the terminal accepts the call, and sends a message to notify the 1x network. In this case the terminal sends a message to notify the 1x base station that the call is accepted, and then the 1x base station notifies the MSC that the terminal accepts the call.

Embodiment 4

Figure 5:
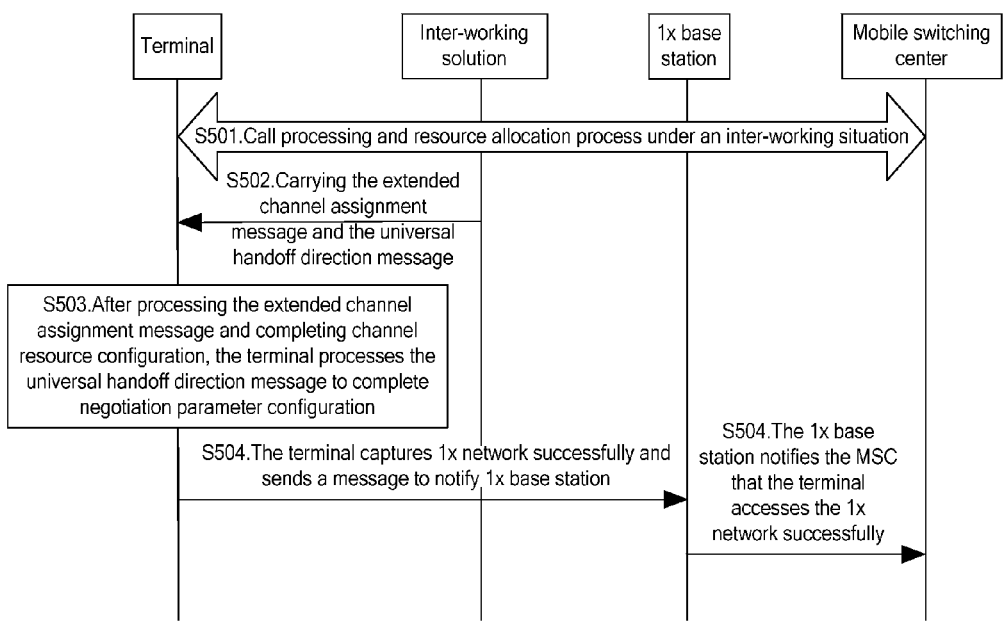
FIG. 5 shows the processing flowchart of user call establishing according to embodiment 4 of the disclosure.

As shown in FIG. 5, the processing flow of user call establishing according to the embodiment comprises the following steps.

Step S501: The call processing and resource distribution process under the situation of inter-working among the terminal, the IWS and the 1x network, comprising originating a call, paging and transferring of the paging response message through tunnels provided by other radio access technologies, subsequent establishment and resource distribution process triggered by the paging response, etc.

Step S502: The IWS constructs a 1x channel assignment message and a service negotiation parameter transfer message according to the received information sent from the 1x network, encapsulates the two messages in one message and sends to the terminal. In this case, the service negotiation parameter transfer message may be a universal handoff direction message; and the message carrying the service negotiation parameter transfer message and the channel assignment message of the 1x air interface may be a GCSNA1xCircuitService message.

The service negotiation parameter transfer message and the channel assignment message of the 1x air interface, carried in the GCSNA1xCircuitService message, are encapsulated in different data units respectively. The data unit in which 1x messages are encapsulated may be a 1x Layer3 data unit or a 1x Layer2 data unit.

Step S503: The terminal receives the GCSNA1xCircuitService message containing the channel assignment message and the service negotiation parameter transfer message, determines that it supports the two messages and the two messages are the channel assignment message and the service negotiation parameter transfer message respectively. Then, the terminal first extracts the channel assignment message to a 1x protocol stack for processing, and after completing the channel resource configuration, processes the service negotiation parameter transfer message to complete the negotiation parameter configuration.

Step S504: After successfully capturing 1x network and completing the negotiation parameter configuration, the terminal sends a message to notify the 1x network. In this case, the terminal sends a message to notify the 1x base station that the terminal accesses successfully, and then the 1x base station notifies the MSC that the terminal accesses successfully.

Through the embodiment, the problem that it is unable to ensure that a plurality of 1x Layer3 messages is transmitted synchronously under the related inter-working situation and the problem of the processing time sequence of messages are solved.

Obviously, those skilled in the art should understand that the above modules or steps of the disclosure could be achieved through general calculating devices. They can be concentrated in a single calculating device or distributed in a network formed by multiple calculating devices. Optionally, they can be achieved by program codes that can be executed by calculating devices. Thus, they can be stored in storage devices to be executed by calculating devices. Under certain situation, the shown or described steps can be executed according to an order different from the above order. Or they can be achieved by respectively making them into many integrated circuit modules or by making multiple modules or steps among them into a single integrated circuit module. In this way, the disclosure is not limited to combinations of any specific hardware and software.

The description above is only preferred embodiments of the disclosure and should not be used for limiting the disclosure. For those skilled in the art, the disclosure can have various alternations and changes. Any modifications, equivalent replacements and improvements within the spirit and principle of the disclosure should be contained within the protection scope of the disclosure.

What is claimed is:

1. A method for transmitting 1x messages, comprising:
   carrying a plurality of 1x messages in one message, when a sending terminal needs to send the plurality of 1x messages to a receiving terminal through a non-1x network; and
   after receiving the message containing a plurality of 1x messages, the receiving terminal processes the plurality of 1x messages according to a sequence of the messages;
   wherein the message carrying the plurality of 1x messages is a General Circuit Service Notification Application 1x Circuit Service (GCSNA 1xCircuitService) message;
   the sending terminal is an Inter Working Solution (IWS);
   the receiving terminal is a terminal which is located in a non-1x network and supports 1x and other radio access technologies; and
   after receiving a paging request message or a feature notification message which is sent from a mobile switching center and carries a caller number, the IWS encapsulates the caller number in the feature notification message of a 1x air interface, and encapsulates a general paging message and the feature notification message of the 1x air interface in one message, and sends to the receiving terminal; or
   during paging processing and resource allocation process under a situation of inter-working among the IWS, the terminal and a 1x network, after completing the resource allocation, the IWS encapsulates a constructed resource assignment message of a 1x air interface and an incoming call notification message of the 1x air interface in one message, and then sends to the terminal.

2. The method according to claim 1, wherein
   the carried plurality of 1x messages are encapsulated in different data units respectively, and
   the data unit in which the 1x messages are encapsulated is a 1x Layer 3 data unit or a 1x Layer 2 data unit.

3. The method according to claim 1, wherein
   the terminal receives the message containing the feature notification message and the general paging message, and extracts the feature notification message first; and
   further processes the general paging message if a user chooses to accept the call, and does not process the general paging message if the user chooses to refuse the call.

4. The method according to claim 1, wherein
   the terminal receives the message containing the resource assignment message of the 1x air interface and the incoming call notification message of the 1x air interface, processes the resource assignment message first, and then processes the incoming call notification message; and
   the resource assignment message of the 1x air interface is an extended channel assignment message and/or a universal handoff direction message.

5. The method according to claim 1, wherein
the sending terminal is a terminal which is located in a non-1x network and supports 1x and other radio access technologies; and
the receiving terminal is an IWS.

6. The method according to claim 1, wherein the message carrying the plurality of 1x messages is a message defined by a protocol supporting inter-working between CDMA 2000 1x RTT and other radio access technologies.

7. A system for transmitting 1x messages, comprising a sending terminal and a receiving terminal, wherein
the sending terminal is configured to, when the sending terminal needs to send a plurality of 1x messages to a receiving terminal through a non-1x network, carry the plurality of 1x messages in one message; and
the receiving terminal is configured to, after receiving the message containing the plurality of 1x messages, process the plurality of 1x messages according to a sequence of the messages;
wherein the message carrying the plurality of 1x messages is a General Circuit Service Notification Application 1x Circuit Service (GCSNA 1xCircuitService) message;
the sending terminal is an Inter Working Solution (IWS);
the receiving terminal is a terminal which is located in a non-1x network and supports 1x and other radio access technologies;
during paging processing and resource allocation process under a situation of inter-working among the IWS, the terminal and a 1x network, after completing the resource allocation, the IWS encapsulates a constructed resource assignment message of a 1x air interface and an incoming call notification message of the 1x air interface in one message, and then sends to the terminal; or
after receiving a paging request message or a feature notification message which is sent from a mobile switching center and carries a caller number, the IWS encapsulates the caller number in a feature notification message of a 1x air interface, encapsulates a general paging message and the feature notification message of the 1x air interface in one message, and then sends to the receiving terminal.

8. The system according to claim 7, wherein the sending terminal encapsulates the sent plurality of 1x messages in different data units respectively, and
the data unit in which the 1x messages are encapsulated is a 1x Layer 3 data unit or a 1x Layer 2 data unit.

9. The system according to claim, wherein
that the receiving terminal processes the plurality of 1x messages according to the sequence of the messages after receiving the message containing the plurality of 1x messages comprises: after receiving the message containing the feature notification message and the general paging message, the terminal extracting the feature notification message first; and further processing the general paging message if a user chooses to accept the call, and not processing the general paging message if the user chooses to refuse the call.

10. The system according to claim 7, wherein
that the receiving terminal processes the plurality of 1x messages according to the sequence of the messages after receiving the message containing the plurality of 1x messages comprises: after receiving the message containing the resource assignment message of the 1x air interface and the incoming call notification message of the 1x air interface, the terminal processing the resource assignment message first, and then processing the incoming call notification message; and the resource assignment message of the 1x air interface is an extended channel assignment message and/or a universal handoff direction message.

11. The system according to claim 7, wherein
the sending terminal carries the plurality of 1x messages in one message defined by a protocol supporting inter-working between CDMA 2000 1 x RTT and other radio access technologies.

12. A terminal for transmitting 1x messages, wherein
the terminal is configured to, after receiving a message containing a plurality of 1x messages, process the plurality of 1x messages according to a sequence of the messages;
the terminal is a terminal which is located in a non-1x network and supports 1x and other radio access technologies;
after receiving a message containing a resource assignment message of a 1x air interface and an incoming call notification message of the 1x air interface, the terminal processes the resource assignment message first, and then processes the incoming call notification message; and the resource assignment message of the 1x air interface is an extended channel assignment message and/or a universal handoff direction message; or
after receiving the message containing the extended channel assignment message and the universal handoff direction message, the terminal processes the extended channel assignment message first, and then processes the universal handoff direction message.

13. A method for transmitting 1x messages, comprising:
carrying a plurality of 1x messages in one message, when a sending terminal needs to send the plurality of 1x messages to a receiving terminal through a non-1x network;
after receiving the message containing a plurality of 1x messages, the receiving terminal processes the plurality of 1x messages according to a sequence of the messages;
the sending terminal is an Inter Working Solution (IWS);
the receiving terminal is a terminal which is located in a non-1x network and supports 1x and other radio access technologies;
during the call processing and resource allocation process under a situation of inter-working among the IWS, the terminal and a 1x network, after completing the resource allocation, the IWS encapsulates a plurality of constructed resource assignment messages of a 1x air interface in one message and then sends to the receiving terminal; and
the plurality of resource assignment messages of the 1x air interface contain an extended channel assignment message and a universal handoff direction message.

14. A system for transmitting 1x messages, comprising a sending terminal and a receiving terminal, wherein
the sending terminal is configured to, when the sending terminal needs to send a plurality of 1x messages to a receiving terminal through a non-1x network, carry the plurality of 1x messages in one message;
the receiving terminal is configured to, after receiving the message containing the plurality of 1x messages, process the plurality of 1x messages according to a sequence of the messages;
the sending terminal is an Inter Working Solution (IWS);
the receiving terminal is a terminal which is located in a non-1x network and supports 1x and other radio access technologies;
during call processing and resource allocation process under a situation of inter-working among the IWS, the terminal and a 1x network, after completing the resource allocation, the IWS encapsulates a plurality of constructed resource assignment messages of the 1x air interface in one message, and then sends to the terminal; and the plurality of resource assignment messages of the 1x air interface contain an extended channel assignment message and a universal handoff direction message.

15. A terminal for transmitting 1x messages, wherein the terminal is configured to, after receiving a message containing a plurality of 1x messages, process the plurality of 1x messages according to a sequence of the messages;

the terminal is a terminal which is located in a non-1x network and supports 1x and other radio access technologies;

after receiving a message containing a feature notification message and a general paging message, the terminal extracts the feature notification message first; and further processes the general paging message if a user chooses to accept the call, and does not process the general paging message if the user chooses to refuse the call; and after receiving the message containing the extended channel assignment message and the universal handoff direction message, the terminal processes the extended channel assignment message first, and then processes the universal handoff direction message.

* * * * *